L. JAENICHEN.
SCALE.
APPLICATION FILED APR. 29, 1915.
1,240,219.
Patented Sept. 18, 1917.
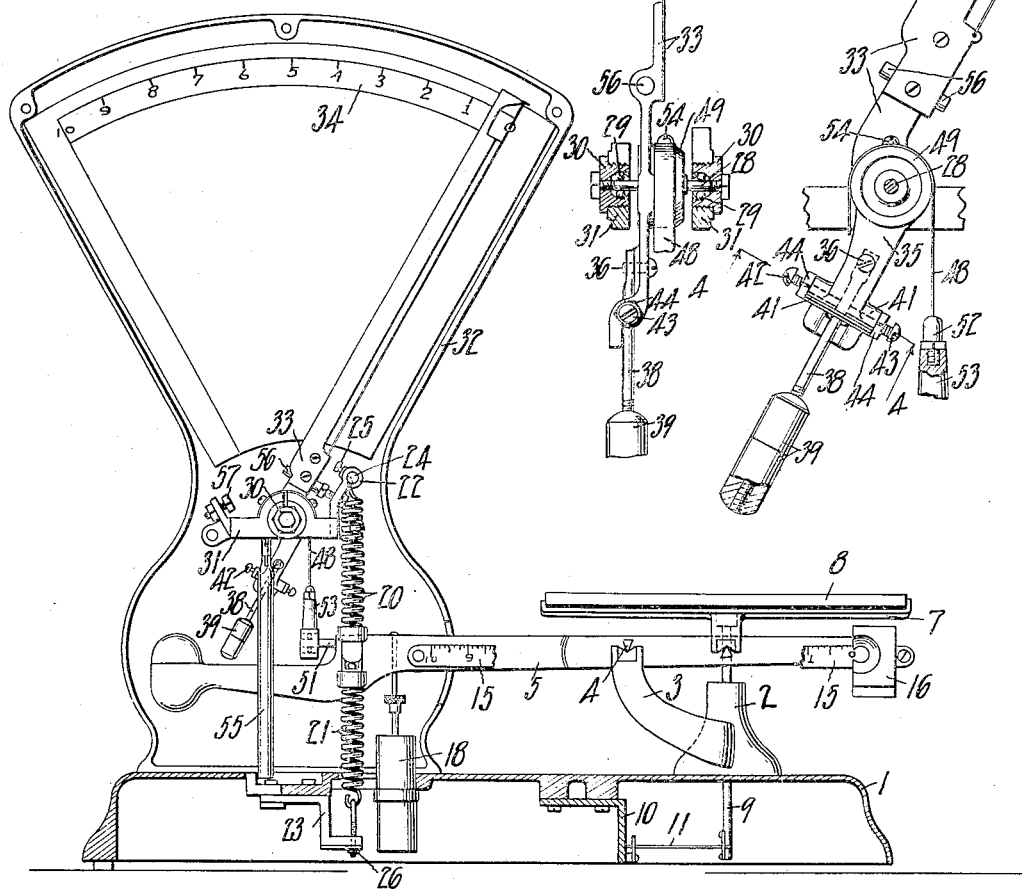
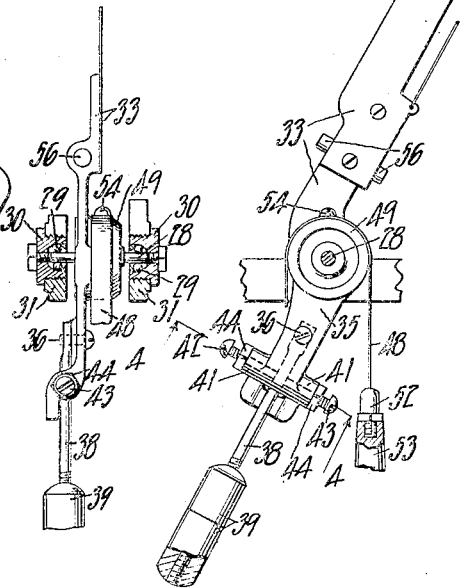
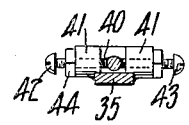
Witnesses
E. R. Barrett
H. W. Kreinbring
Inventor
Louis Jaenichen,
By Pagelsen & Spencer
Attorneys

UNITED STATES PATENT OFFICE.

LOUIS JAENICHEN, OF DETROIT, MICHIGAN, ASSIGNOR TO THE STANDARD COMPUTING SCALE COMPANY, OF DETROIT, MICHIGAN, A CORPORATION OF MICHIGAN.

SCALE.

1,240,219.  Specification of Letters Patent.  Patented Sept. 18, 1917.

Application filed April 29, 1915. Serial No. 24,627.

*To all whom it may concern:*

Be it known that I, LOUIS JAENICHEN, a citizen of the United States, residing at Detroit, in the county of Wayne and State of Michigan, have invented a new and useful Scale, of which the following is a specification.

In the use of spring beam-scales having a pointer attached at one end for multiplying the beam movement to such a degree that it may be read accurately on a scale, considerable difficulty has been experienced because of the fact that the lever arm of the scale-beam, with respect to the pointer, varies slightly as the beam swings. Thus, assuming the weight indication to be correct at either end of the scale, an appreciable error may be found to exist in the indication at the opposite end.

There is shown in my application for United States Letters Patent, Serial Number 794,084, filed October 8, 1913, an adjusting member movable substantially radially in respect to the axis of the pointer pivot, which, although operative for the purpose of counterbalancing the pointer, and, in this manner, determining a single point or angle in the movement of the pointer at which its reading is theoretically accurate, does not admit of shifting this angle or point along the scale.

The present invention consists in means whereby the pointer may be made to give theoretically accurate readings at any desired point:—when set to read accurately at about the mid portion of the scale, it is found that the maximum error in the reading at the ends is very much reduced and, for practical purposes, becomes negligible.

In the drawings, Figure 1 is a longitudinal section through one form of scale in which my invention is embodied. Fig. 2 is an enlarged fragmentary side view of the pointer. Fig. 3 is an end view corresponding to Fig. 1, parts being broken away. Fig. 4 is a section on the line 4—4 of Fig. 2.

Similar reference characters refer to like parts throughout the several views.

The base 1, pedestal 2—3, knife edges 4, main lever 5, spider 7, plate 8, check lever 9, check bar support 10, and check bar 11 may be substantially the same as those described in my above identified application for patent, or of any other desired form. Likewise, the main lever may carry the scale bar 15 upon which the weight 16 is slidable, and may have its movement cushioned by the dashpot 18, while the effect of the load in turning the main lever about the knife edges 4 is resisted by the opposed springs 20 and 21 of equal strength, the outer ends of which are adjustably attached, respectively, to the members 22 and 23 in any desired manner; for example, by the eccentric 24 held in place by the set screws 25 and by the nut 26.

Attached to the pivot 28 that turns in ball bearings 29 carried in plugs 30, threaded in the spaced supporting bars 31 (the latter of which are secured to the casing 32), is the pointer lever, one end 33 of which is arranged to sweep over the scale 34 that, besides the weight indications shown, may bear the usual cost figures. The opposite end 35 of the pointer lever may be provided with a pivot 36, parallel to the pivot 28, on which a threaded arm 38, having a counterweight 39 longitudinally adjustable thereon, is arranged to swing vertically in a slot 40 between lugs 41 integral with the pointer lever. For adjusting the arm 38, the lugs 41 are threaded to receive the opposed screws 42 and 43, that are retained in any desired position by the lock nuts 44.

Movement of the main lever 5 is transmitted to the pointer lever by means of a thin band 48, preferably steel, that passes over a drum 49 rigid with the pivot 28, and has one of its ends adjustably attached to a rod 51 that projects from the main beam, by a threaded sleeve 52 and shackle 53. The band may be secured to the drum by a screw 54, and preferably has its opposite end attached to a counterpoise 55.

In order to limit the movement of the pointer, it may be provided with lugs 56 that contact with the adjustable stops 57.

The opposed springs 20 and 21 are effective in mutually counterbalancing one another through a considerable range of temperature; and the movements of the main beam are transmitted to the pointer by the action of the band 48 and counterpoise 55. Since, however, the main beam swings about the pivots 4, and the point of engagement of the shackle 53 with the rod 51 is fixed, it follows that the lever arm of the main beam, with respect to the pointer lever, varies slightly as the beam swings. Therefore, if the pointer indicates the correct weight at one position, the indication at other points will be in error, and the amount of the error depends on the angular swing of the pointer from the point of accurate weighing. After counterbalancing the pointer lever by moving the weight 39 along the arm 38, it is only necessary to properly adjust the screws 42—43 in order to shift the point of accurate weighing along the scale until the minimum error for the instrument is found. This minimum error is much less than the error that ordinarily exists in the usual scales of this type.

It is clear that changes may be made in the details of construction without departing from the spirit of my invention. I do not, therefore, wish to be limited otherwise than as indicated by the subjoined claim.

I claim:—

A scale comprising in combination a load receiver, a beam on which the load receiver is carried, means for pivotally supporting the beam, a spring for controlling the movement of the beam, a pointer, means for pivotally supporting the pointer, a scale over which the pointer may swing, a drum secured to rotate with the pointer, a flexible band for connecting the beam to the drum to cause the latter and the drum to move with the former, a vertically movable counterweight arranged to act tangentially to the drum in opposition to the beam, and means for shifting the center of gravity of the pointer, said means comprising a counterpoise operatively connected thereto, and means for shifting the counterpoise laterally in respect to the pivotal axis of the pointer.

In testimony whereof I sign this specification in the presence of two subscribing witnesses.

LOUIS JAENICHEN.

Witnesses:
EDWARD N. PAGELSEU,
HUGO W. KREINBRING.